US009475565B2

(12) United States Patent
Gallato

(10) Patent No.: US 9,475,565 B2
(45) Date of Patent: Oct. 25, 2016

(54) BOAT DRIVE

(71) Applicant: ZF Friedrichshafen AG, Friedrichshafen (DE)

(72) Inventor: Fernando Gallato, Padua (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/405,461

(22) PCT Filed: May 3, 2013

(86) PCT No.: PCT/EP2013/059201
§ 371 (c)(1),
(2) Date: Dec. 4, 2014

(87) PCT Pub. No.: WO2014/000924
PCT Pub. Date: Jan. 3, 2014

(65) Prior Publication Data
US 2015/0183501 A1 Jul. 2, 2015

(30) Foreign Application Priority Data
Jun. 25, 2012 (DE) .................... 10 2012 210 727

(51) Int. Cl.
*B63H 5/125* (2006.01)
*B63H 21/30* (2006.01)
*F16J 15/24* (2006.01)
(Continued)

(52) U.S. Cl.
CPC ............ *B63H 21/30* (2013.01); *B63H 5/125* (2013.01); *F16J 15/18* (2013.01); *F16J 15/24* (2013.01); *B63H 2020/025* (2013.01)

(58) Field of Classification Search
CPC B63H 21/30; B63H 5/125; B63H 2020/025; B63H 2005/1254; F16J 15/18; F16J 15/24
USPC .................. 440/111, 112, 6, 51, 52, 54, 55
See application file for complete search history.

(56) References Cited

U.S. PATENT DOCUMENTS

| 2,466,635 A | 4/1949 | Brown et al. |
| 2,586,019 A | 2/1952 | Frohlich |

(Continued)

FOREIGN PATENT DOCUMENTS

| DE | 69 37 931 | 9/1969 |
| DE | 27 48 276 A1 | 5/1978 |

(Continued)

OTHER PUBLICATIONS

German Search Report Corresponding to 10 2012 210 727.4 mailed Sep. 11, 2014.

(Continued)

*Primary Examiner* — Anthony Wiest
(74) *Attorney, Agent, or Firm* — Davis & Bujold, PLLC; Michael J. Bujold

(57) ABSTRACT

A boat drive (1) with an upper drive portion (3), arranged inside a hull (2) of the boat, and a pivoting lower drive portion (4), arranged outside the hull (2) of the boat. The boat drive (1) passes through an opening (6) in the bottom of the hull (2) of the boat, forming an annular gap (5) that surrounds a periphery of the boat drive, and a sealing arrangement (10) is arranged in the area of the annular gap (5). The sealing arrangement (10) is designed as a sliding seal.

15 Claims, 2 Drawing Sheets

(51) Int. Cl.
*F16J 15/18* (2006.01)
*B63H 20/02* (2006.01)

(56) References Cited

U.S. PATENT DOCUMENTS

| | | | |
|---|---|---|---|
| 2,834,313 A | 5/1958 | Frohlich | |
| 4,236,478 A | 12/1980 | Mansson | |
| 4,543,069 A | 9/1985 | Kobayashi | |
| 5,904,601 A | 5/1999 | Palokangas et al. | |
| 7,186,157 B2 * | 3/2007 | Mansson | B63H 20/245 440/112 |
| 7,690,959 B1 | 4/2010 | Szilagyi et al. | |
| 8,740,662 B2 | 6/2014 | Gallato et al. | |
| 2011/0195619 A1 * | 8/2011 | Davis | B63H 5/125 440/75 |

FOREIGN PATENT DOCUMENTS

| | | |
|---|---|---|
| DE | 10 2008 024 540 A1 | 12/2009 |
| DE | 10 2009 000 994 A1 | 8/2010 |
| FR | 2 369 965 | 6/1978 |
| GB | 1 569 661 | 6/1980 |
| GB | 2 088 805 A | 6/1982 |
| GB | 2 483 915 A | 3/2012 |
| WO | 03/093105 A1 | 11/2003 |
| WO | 2005/005249 A | 1/2005 |
| WO | 2012/038305 A1 | 3/2012 |

OTHER PUBLICATIONS

International Search Report Corresponding to PCT/EP2013/059201 mailed Oct. 7, 2013.

Written Opinion Corresponding to PCT/EP2013/059201 mailed Oct. 7, 2013.

* cited by examiner

BOAT DRIVE

This application is a National Stage completion of PCT/EP2013/059201 filed May 3, 2013, which claims priority from German patent application serial no. 10 2012 210 727.4 filed Jun. 25, 2012.

FIELD OF THE INVENTION

The invention concerns a sealing arrangement for a pivotable boat drive. Such boat drives are also called POD drives.

BACKGROUND OF THE INVENTION

Known inboard boat drives have a steering and propulsion unit arranged underwater, which can pivot about a vertical axis. The boat is propelled by one or two propellers, whose rotational axis can be pivoted by means of a steering unit. By virtue of the pivotability of the rotational axis of the propellers, a steering effect of the boat is produced. The propulsion and steering unit has a column arranged vertically, which accommodates the driveshaft for the propeller and which passes through an opening in the hull of the boat. In the area of the opening there is an annular gap around the column, the dimensions of which differ and are variable depending on manufacturing and assembly tolerances and on the operating conditions. The annular gap has to be sealed so that no water can make its way into the inside of the boat's hull.

In known boat drives the pivotable steering and propulsion unit is supported and sealed relative to the opening in the hull, for example by elastic rings. The reaction forces that result from the propeller thrust are then transmitted to the hull of the boat by the elastic rings. Examples of this are described in the documents WO 2012/038305 A1 and DE 2748276 A1. In the arrangement according to DE 2748276 A1 the boat drive is fastened to the hull of the boat by flexible fastening elements. The flexible fastening of the boat drive in the boat's hull has the consequence that at the opening between the vertical column of the boat drive and the rim of the opening in the boat's hull, a variable annular gap is produced, which has to be reliably sealed by a sealing arrangement.

With the known sealing arrangements it is problematic that the elastic rings have to absorb and transmit relatively large forces and at the same time they have to reliably seal an annular gap whose dimensions vary. Accordingly, for such sealing arrangements the choice of material for the sealing rings, particularly in relation to their elasticity, is always a compromise between the two functions of force transmission and sealing. Furthermore, such seals are subject to considerable wear as the result of relative movements between the boat drive and the hull of the boat or between the seal and the component to be sealed. This is particularly relevant in the case of a boat drive, which is suspended elastically relative to the boat's hull and which therefore undergoes oscillations, especially in the vertical direction.

SUMMARY OF THE INVENTION

The purpose of the present invention is to provide a sealing arrangement for a boat drive of the type mentioned to begin with, which ensures a durable and improved sealing action and which nevertheless permits for example horizontal and vertical movements of the boat drive relative to the boat's hull, caused by oscillations.

The objective on which the invention is based is achieved by a boat drive having the characteristics as described below.

According to these, a boat drive is claimed which has an upper drive portion arranged inside the hull of a boat and a pivotable lower drive portion arranged outside the boat's hull, wherein the boat drive passes through an opening in the boats' hull, forming an annular gap around the periphery of the boat drive, and wherein a sealing arrangement for sealing the inside space of the boat against water penetration is arranged in the area of the annular gap. According to the invention, the sealing arrangement is designed as a sliding seal.

A sliding seal is a seal in which two components that slide on one another seal different spaces relative to one another. In the present case the space inside the boat's hull is sealed relative to the space outside the hull, to prevent the entry of water.

Compared with known sealing arrangements, the sealing arrangement according to the invention with sliding sealing elements has the advantage that the elastic sealing elements are permanently compressed with an almost constant pre-stress, and are not repeatedly compressed and relaxed by movements of the boat drive in the boat's hull that take place during operation. The pre-stressing, with which the sealing elements are pressed against the sealing contact surface, can be selectively calculated and predetermined in order to thereby, in combination with a selective choice of material, achieve a reliable seal and long service life of the sealing elements. Advantageously, the sealing elements are made from an elastic material such as rubber or an elastic synthetic material such as those used for known O-rings.

Essential for the functionality of the sealing arrangement according to the invention is that relative movements between the boat drive and the hull of the boat in various directions are compensated in such manner that reliable sealing of the inside space of the boat against the penetration of water through the annular gap is ensured. Preferably, this is achieved when the relative movements are compensated by separate sealing elements that slide on a respectively associated sealing surface orientated in a particular direction. In this way the relative movements between the boat drive and the hull of the boat in the annular gap are compensated. Depending on the movement direction of the relative movements, the sealing surfaces can for example also be formed slightly obliquely or vaulted, i.e. shaped concavely or convexly.

To compensate the relative movements in different directions, the sealing arrangement preferably comprises at least one first sealing element and/or at least one second sealing element, which can move separately and independently of one another. During displacement of the boat drive relative to the boat's hull, the first sealing element slides along at least one first sealing surface arranged on the boat drive and during displacement of the boat drive relative to the boat's hull, the second sealing element slides along at least one second sealing surface arranged on the hull of the boat.

Preferably, the at least one first sealing surface is arranged perpendicularly to the second sealing surface, whereby displacements in the most varied directions can be compensated. In this case, the at least one first sealing surface is preferably in a plane substantially parallel to a plane that contains the opening in the bottom of the hull. For example, in a horizontal bottom of the boat's hull, the opening is in a horizontal plane and correspondingly the first sealing element is arranged parallel to that horizontal plane. If the opening is arranged in an area of the bottom of the hull that is inclined relative to the water's surface, the first sealing surface is correspondingly inclined.

In this description, the term horizontal refers to the condition of the boat when it is upright in the water with the boat drive correctly fitted, 'horizontal' then meaning substantially parallel to the surface of calm water, whereas 'vertical' means perpendicular, i.e. orthogonal thereto.

The sealing elements are preferably in the form of elastic sealing rings, in particular O-rings. Such sealing rings have proved their worth as reliable sealing elements. Suitable materials such as rubber or plastics, and their properties for elastic sealing rings of this type, are sufficiently well known.

According to a further preferred design, the at least one first sealing element and the at least one second sealing element are arranged on a common support ring, the support ring being arranged and able to move in the annular gap. For example, the support ring is fitted into the annular gap in such manner that during displacement of the boat drive relative to the boat's hull in the plane of the opening in the hull bottom, the ring is supported against the inside surface of the opening and moves relative to the boat drive. During movement of the boat drive in the boat's hull that take place perpendicularly to the plane of the opening, the support ring moves together with the boat drive and is displaced relative to the hull of the boat.

Preferably, the sealing arrangement comprises in each case exactly two first and two second sealing elements. It has been shown that with two sealing elements for each direction, reliable and durable sealing of the annular gap can be achieved.

In the context of the present invention it is also conceivable that the sealing elements are formed integrally with the support ring. In such a design of the invention the support ring has correspondingly shaped areas which, as sealing elements, slide along the sealing surfaces opposite them and so compensate for the relative movement between the boat drive and the hull in the annular gap. The support ring is preferably made with some clearance relative to the outer circumference of the boat drive and, during relative movement between the boat drive and the boat's hull, automatically centers itself in the annular gap.

Advantageously, the second sealing surface is formed by the inside circumference of a ring extending around the opening in the boat's hull. Such a ring can either be formed as a separate component and attached to the boat's hull, or it can be made integrally with the hull. On its inside circumference that acts as the sealing surface the ring can be machined in such manner that the inside circumferential surface of the ring allows smooth, low-friction sliding of the sealing element along the surface.

Preferably, the sealing arrangement is sealed on the outside, i.e. on the water side, by an additional sealing component, in particular a so-termed V-ring, attached on the boat drive. Such an additional sealing component protects the sealing surfaces and sealing elements against dirt from the outside, which could compromise the proper function of the sealing arrangement, and thereby increases the reliability and durability of the sealing arrangement.

With a circular opening in the hull of the boat, the invention can be implemented particularly simply and effectively, since the annular gap is then at least approximately circular and can be sealed reliably by the sealing arrangement claimed in the event of relative movement between the boat drive and the hull of the boat. The circular form of the sealing arrangement enables better and simpler production and assembly of the individual components of the sealing arrangement compared with differently shaped designs.

In a further preferred embodiment of the invention, the boat drive is fixed in the boat's hull by elastic fastening elements arranged on the upper drive portion. The elastic fastening elements transmit to the hull both the gravitational forces produced by the weight of the boat drive, and also the propulsion forces produced by the rotating propeller during operation. Furthermore the elastic fastening elements dampen vibrations and jolts produced by a drive motor and prevent vibrations or jolts from the boat drive from being transmitted to the hull. This enhances traveling comfort for the passengers and reduces noise emission.

The elastic attachment of the boat drive to the boat's hull enables the aforesaid relative movements between the boat drive and the hull. The size of the opening in the bottom of the hull is such that the relative movements between the boat drive and the boat's hull required for transmitting the forces and damping the vibrations are able to take place. The variations of the annular gap caused by the relative movements have to be compensated by the sealing arrangement in such manner that despite the relative movement, no water penetrates to the inside space of the hull.

The present invention now preferably provides that the sealing arrangement and the fastening elements are designed such that all the substantial forces from the boat drive are transmitted to the boat's hull by the fastening elements. In other words the sealing arrangement itself does not transmit any force from the boat drive to the boat's hull or vice-versa, apart from the small forces produced by sliding friction between the sealing elements and the sealing surfaces. This is achieved by making the clearance provided for the support ring in the annular gap larger than the maximum displacement resulting from the relative movement between the boat drive and the boat's hull. This maximum displacement depends essentially on the design of the elastic fastening elements by which the boat drive is attached to the hull. Accordingly, it is necessary to match the fastening of the boat drive to the design of the sealing arrangement in such manner that the sealing arrangement transmits no substantial forces from the boat drive to the hull of the boat or vice-versa.

Finally, the present invention covers a boat having a boat drive as described above.

BRIEF DESCRIPTION OF THE DRAWINGS

The invention is explained in greater detail with reference to the embodiment described below and illustrated in the drawings, which show.

DETAILED DESCRIPTION OF THE PREFERRED EMBODIMENTS

Figure 1:
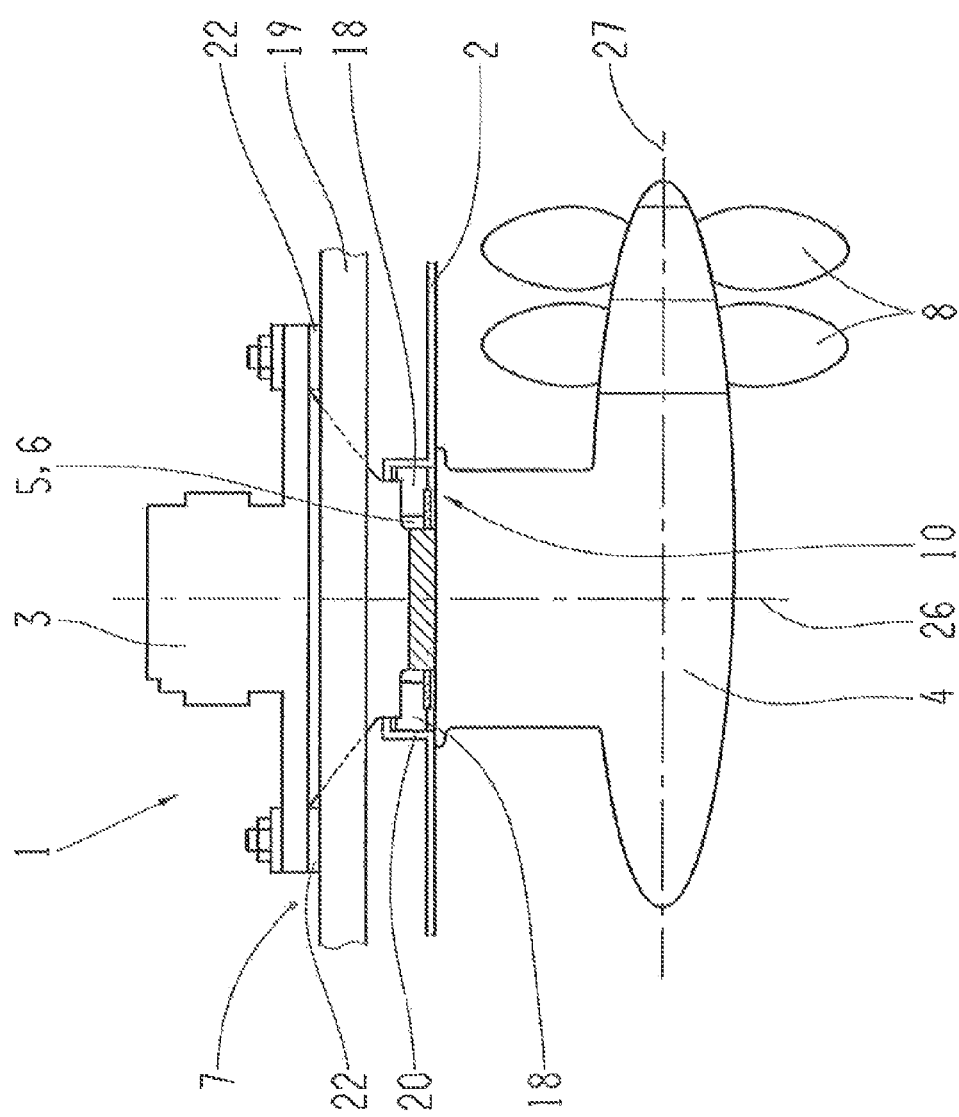
FIG. 1: A schematic representation of the structure of a boat drive according to the invention, viewed from the side.
Figure 2:
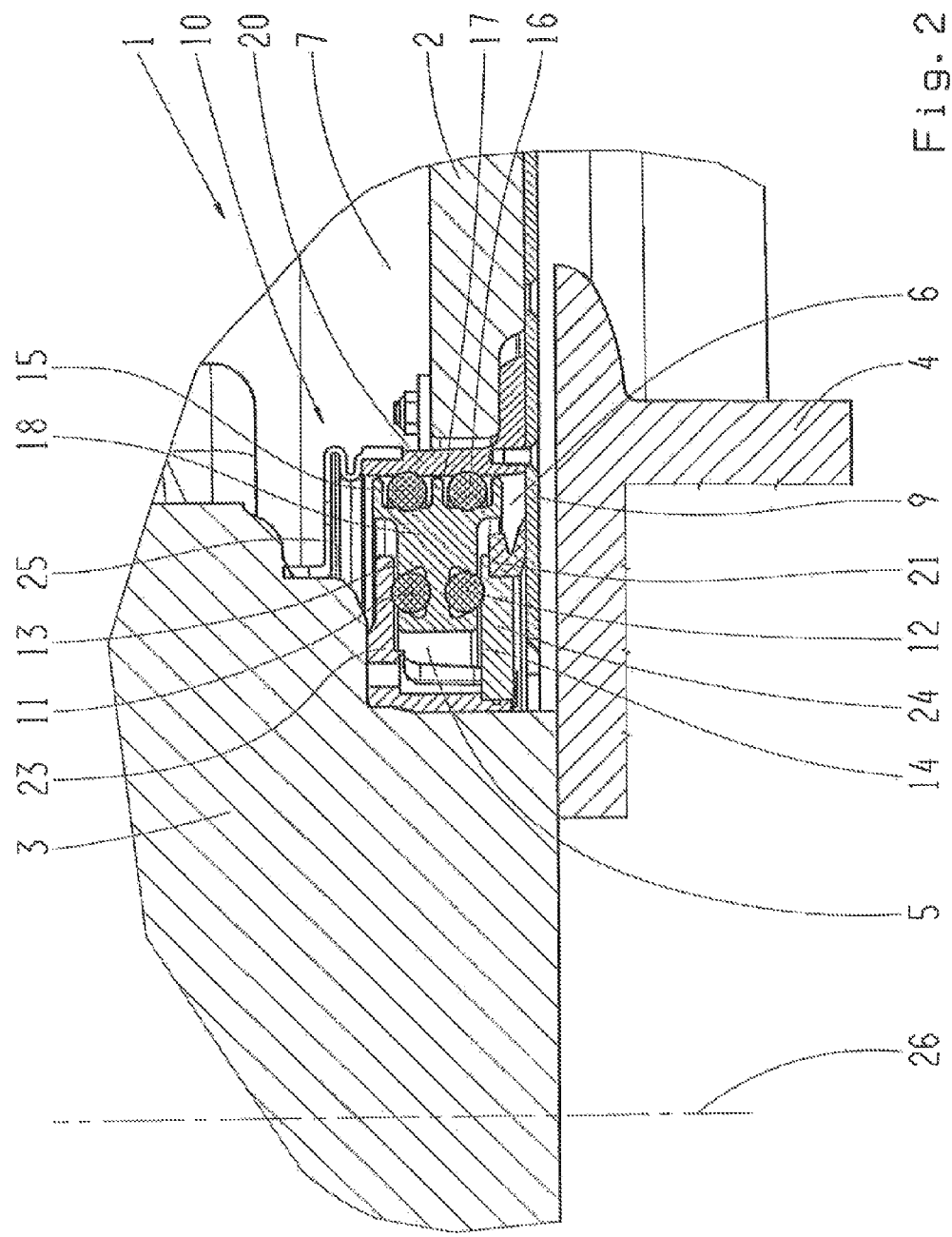
FIG. 2: A section of a boat drive according to the invention showing an enlarged representation of the sealing arrangement.

In FIGS. 1 and 2 the same elements are denoted by the same indexes.

The boat drive 1 according to the invention comprises an upper drive portion 3 arranged inside the hull 2 of a boat and a lower drive portion 4 arranged outside the boat's hull 2. The lower drive portion 4 comprises two propeller screws 8 that can be driven by the boat drive 1 and which are arranged to rotate about a rotational axis 27. Thus, the movement direction of the boat is also directed substantially along the rotational axis 27. To power the propellers 8, they can be driven, by way of driveshafts and transmission elements (not shown), by a drive motor in the upper drive portion 3. The drive motor, the driveshafts and the transmission elements are part of the boat drive 1 and are arranged inside the boat drive 1. The lower drive portion 4 can pivot about a pivoting axis 26, whereby the boat can be steered in the desired direction. Such a boat drive is also referred to as a POD drive.

The boat drive 1 as a whole, with its upper drive portion 3 and its lower drive portion 4, extends from inside the boat's hull 2 through the bottom of the hull 2. To enable this, an opening 6 is provided in the bottom of the hull 2. In the area of the opening 6 an annular gap 5 is formed around the boat drive 1. In that annular gap 5 is arranged a sealing arrangement 10 in the form of a sliding seal. In this example embodiment both the opening 6 and also the essential parts of the sealing arrangement 10 are of circular or circular ring shape, which favors simple production and reliable functioning of the sealing arrangement.

The sealing arrangement 10 consists essentially of a support ring 18, first and second sealing elements 11, 12, 15, 16 attached on the support ring, and first and second sealing surfaces 13, 14, 17 which are in sliding contact with the sealing elements 11, 12, 15, 16. The support ring 18 is arranged in the annular gap 5 so that it can move both relative to the boat drive 1 and relative to the hull 2 of the boat.

When the boat drive 1 moves relative to the boat's hull 2 in the direction of the rotational axis 27, the support ring 18 with its sealing elements 11, 12, 15, 16 moves for example relative to the boat drive 1, in such manner that the first sealing elements 11, and 12 slide along the respectively associated sealing surfaces 13 and 14. The same happens during movements of the boat drive 1 relative to the boat's hull 2 which are directed perpendicularly to the rotational axis 27 and perpendicularly to the pivoting axis 26.

During movements of the boat drive 1 relative to the boat's hull 2 in the direction of the pivoting axis 26, the support ring 18 moves with its sealing elements 11, 12, 15, 16 relative to the hull 2 of the boat, in such manner that the second sealing elements 15 and 16 slide along the sealing surface 17.

As a rule, during operation the boat drive 1 will undergo movements relative to the boat's hull 2 which are directed in several of the above-described directions, so that at the same time both the first sealing elements 11 and 12, and also the second sealing elements 15 and 16 slide along their associated sealing surfaces 13, 14 or 17, respectively. This gives a flexible sealing arrangement in which the sealing elements 11, 12, 15, 16, which in this example embodiment are in the form of elastic O-rings, are always pressed with the same contact force against the associated sealing surfaces 13, 14 or 17. The contact force can be calculated in advance and is chosen to give optimum sealing along with maximum service life. The long service life of the sealing elements is obtained because during operation, the elastic sealing elements are cot continually compressed and relaxed, as they are in conventional sealing arrangements for such applications, but are instead acted on by an approximately constant pre-stress.

During movements of the boat drive 1 relative to the boat's hull 2 in the direction of the rotational axis 27 and movements of the boat drive 1 relative to the hull 2 directed perpendicularly to the rotational axis 27 and perpendicularly to the pivoting axis 26, the first sealing element 11 slides along an upper sealing disk 23 connected firmly to the upper drive portion 3. The machined, smooth surface of the upper sealing disk 23 forms a first sealing surface 13. At the same time the other first sealing element 12 slides along a lower sealing disk 24 connected firmly to the upper drive portion 3, whose machined surface forms a further first sealing surface 14. The support ring 18 is centered relative to the hull 2 of the boat by the sealing elements 15 and 16 in contact around a ring 20 connected firmly to the boat's hull 2, and during the last-described movements it moves with the hull 2. During these movements the support ring 18 is guided between the upper sealing surface 13 in contact with the first sealing element 11 and the lower sealing surface 14 in contact with the first sealing element 12.

During movements of the boat drive 1 relative to the boat's hull 2 in the direction of the pivoting axis 26, the second sealing elements 15 and 16 slide along the sealing surface 17, this second sealing surfaces 17 being formed by the inner surface of the ring 20 connected firmly to the boat's hull 2. In other words, during movements in the direction of the pivoting axis 26, the support ring 18 also moves relative to the boat's hull 2 in the direction of the pivoting axis 26. During this the support ring 18 is, as it were, moved along by the first sealing elements 11 and 12 in contact at the top with the sealing disk 23 and at the bottom with the disk 24.

Relative to the inside space of the boat's hull 2 and on the outside, i.e. on the water side, the annular gap 5 and the parts of the sealing arrangement arranged 10 in it are screened by a flexible sealing element 25 and by a V-ring.

Toward the inside space of the boat's hull 2 the sealing arrangement 10 is sealed by a flexible sealing element 25 in order to protect the sealing arrangement 10 against harmful influences from the inside of the hull 2. The sealing element 25 is connected on one side to the upper drive portion 3, forming a seal therewith, and on the other side to the ring 20 fixed firmly to the boat's hull 2, forming a seal therewith. The flexible sealing element 25 is designed such that it can compensate all of the above-described relative movements between the boat drive 1 and the boat's hull 2.

On the outside, i.e. on the water side, the sealing arrangement 10 is sealed by a V-ring 21 attached to the boat drive 1 in order to protect it against harmful influences from outside. A sealing lip of the V-ring 21 closes the annular gap 5 toward the outside, since the sealing lip is in contact with a disk 9 connected firmly to the hull 2 of the boat. In this way, for example, dirt from the inside of the sealing arrangement 10 is kept away, which could penetrate together with water into the sealing arrangement 10 and would then compromise the function of the sealing arrangement 10.

The boat drive 1 as a whole is fixed into the boat's hull 2 by means of flexible fixing elements 22. The flexible fixing elements 22 connect the upper drive portion 3 to longitudinal support members 19, which in turn are firmly attached to the boat's hull 2 or made integrally therewith. Since the boat drive 1 as a whole is fixed into the hull 2 only by means of the fixing elements 22 described, substantially all the forces are transmitted from the boat drive 1 to the hull 2 of the boat only by way of the fixing elements 22 while the sealing arrangement itself transmits no forces. Thus, the functions of sealing and force transmission between the boat drive and the boat's hull are, as it were, separate. This makes it possible to design the sealing arrangement 10 as a sliding seal and to increase the service life of the sealing elements substantially, because the latter do not have to transmit any substantial forces.

INDEXES

1 Boat drive
2 Boat's hull

3 Upper drive portion
4 Lower drive portion
5 Annular gap
6 Opening
7 Inside space
8 Propeller screw
9 Disk
10 Sealing arrangement
11 First sealing element
12 First sealing element
13 First sealing surface
14 First sealing surface
15 Second sealing element
16 Second sealing element
17 Second sealing surface
18 Support ring
19 Longitudinal support member
20 Ring
21 V-ring
22 Fixing element
23 Upper sealing disk
24 Lower sealing disk
25 Sealing element
26 Pivoting axis
27 Rotational axis

The invention claimed is:

1. A boat drive (1) comprising:
an upper drive portion (3), accommodated by a hull (2) of a boat, and a pivotable lower drive portion (4), arranged below the hull (2) of the boat for engaging water;
an opening (6) being formed in the hull (2) of the boat, and the boat drive (1) passing through the opening (6) so that an annular gap (5) is formed around a periphery of the boat drive;
a sealing arrangement (10) being arranged in an area of the annular gap (5);
the sealing arrangement (10) being designed as a sliding seal;
the boat drive (1) being fixable to the hull (2) of the boat by elastic fixing elements (22) arranged on the upper drive portion (3); and
the sealing arrangement (10) comprises at least one first sealing element (11, 12) which, when the boat drive is displaced relative to the hull of the boat, slides along at least one first sealing surface (13, 14) arranged on the boat drive.

2. The boat drive (1) according to claim 1, wherein the sealing arrangement (10) comprises at least one second sealing element (15, 16) which, when the beat drive is displaced relative to the hull of the boat, slides along at least one second sealing surface (17) arranged on the hull of the boat.

3. The boat drive (1) according to claim 2, wherein the at least one first sealing surface (13, 14) is arranged perpendicularly to the second sealing surface (17).

4. The boat drive (1) according to claim 2, wherein at least one of the first sealing element (11, 12) and the second sealing element (15, 16) is an elastic sealing ring.

5. The boat drive (1) according to claim 2, wherein the first sealing element (11, 12) and the second sealing element (15, 16) are arranged on a common support ring (18), and the support ring (18) is arranged and is movable in the annular gap.

6. The boat drive (1) according to claim 5, wherein at least one of the first sealing element (11, 12) and the second sealing element (15, 16) is formed integrally with the support ring (18).

7. The boat drive (1) according to claim 2, wherein the sealing arrangement (10) comprises two first sealing elements (11, 12) and two second sealing elements (15, 16).

8. The boat drive according to claim 2, wherein the second sealing surface (17) is formed by an inside surface of a ring (20) which extends along the opening (6) in the hull (2) of the boat.

9. The boat drive according to claim 1, wherein the at least one first sealing surface (13, 14) lies in a plane which is arranged substantially parallel to a plane in which the opening (6) in the hull of the boat is located.

10. The boat drive (1) according to claim 1, wherein an additional sealing component seals the sealing arrangement (10) on a water side of the sealing arrangement.

11. The boat drive (1) according to claim 1, wherein the opening (6) is circular.

12. The boat drive (1) according to claim 1, wherein the sealing arrangement (10) and the fixing elements (22) are designed such that forces from the boat drive (1), apart from frictional forces in the sealing arrangement (10), are transmitted to the hull (2) of the boat only by way of the fixing elements (22).

13. A boat incorporating a boat drive, and the boat drive comprising:
an upper drive portion, accommodated by a hull of a boat, and a pivotable lower drive portion, arranged below the hull of the boat for engaging water;
an opening being formed in the hull of the boat, and the boat drive passing through the opening so that an annular gap is formed around a periphery of the boat drive;
a sealing arrangement being arranged in an area of the annular gap;
the sealing arrangement being designed as a sliding seal;
the boat drive being fixable to the hull of the boat by elastic fixing elements arranged on the upper drive portion; and
the sealing arrangement comprises at least one first sealing element which, when the boat drive is displaced relative to the hull of the boat, slides along at least one first sealing surface arranged on the boat drive.

14. A boat drive comprising:
an upper drive portion being accommodated by a hull of a boat, and a lower drive portion being arranged underneath the hull of the boat to engage water during use of the boat;
the boat drive passing through an opening formed in a bottom of the hull of the boat, and the opening defining a plane and forming an annular gap that surrounds a periphery of the boat drive;
a sealing arrangement being arranged within the annular gap, and the sealing arrangement comprising a sliding seal;
the boat drive being fixed to the hull by elastic fixing elements arranged on the upper drive portion of the boat drive; and
the sealing arrangement comprises a first sealing element which, when the boat drive is displaced relative to the hull of the boat, slides along a first sealing surface arranged on the boat drive.

15. The boat drive according to claim 14, wherein the annular gap is located between an exterior surface of the upper drive portion of the boat drive and an interior surface at the bottom of the hull which forms the opening;
a sealing ring is fixed to the interior surface at the bottom of the hull and has a sealing surface which extends normal the plane of the opening;

first and second disks are fixed to the exterior surface of the upper drive portion of the boat drive and the first disk has the first sealing surface and the second disk has a second sealing surface, and the first and the second sealing surfaces of the respective first and the second disks face each other and are parallel to the plane of the opening;

a support ring having the first sealing element, and second and third sealing elements is arranged within the annular gap such that the first sealing element contacts the first sealing surface of the first disk, the second sealing element contacts the second sealing surface of the second sealing disk and the third sealing element contacts the sealing surface of the sealing ring so as to form a seal between an interior and an exterior of the hull and between the bottom of the hull and the upper drive portion of the boat drive;

the first sealing element being slidable along the first sealing surface of the first disk and the second sealing element being slidable along the second sealing surface of the second disk when the upper drive portion moves with respect to the hull in a direction parallel to the plane, and the third sealing element being slidable along the sealing surface of the sealing ring when the upper drive portion moves with respect to the hull in a direction normal to the plane.

\* \* \* \* \*